United States Patent Office 3,293,614
Patented Dec. 20, 1966

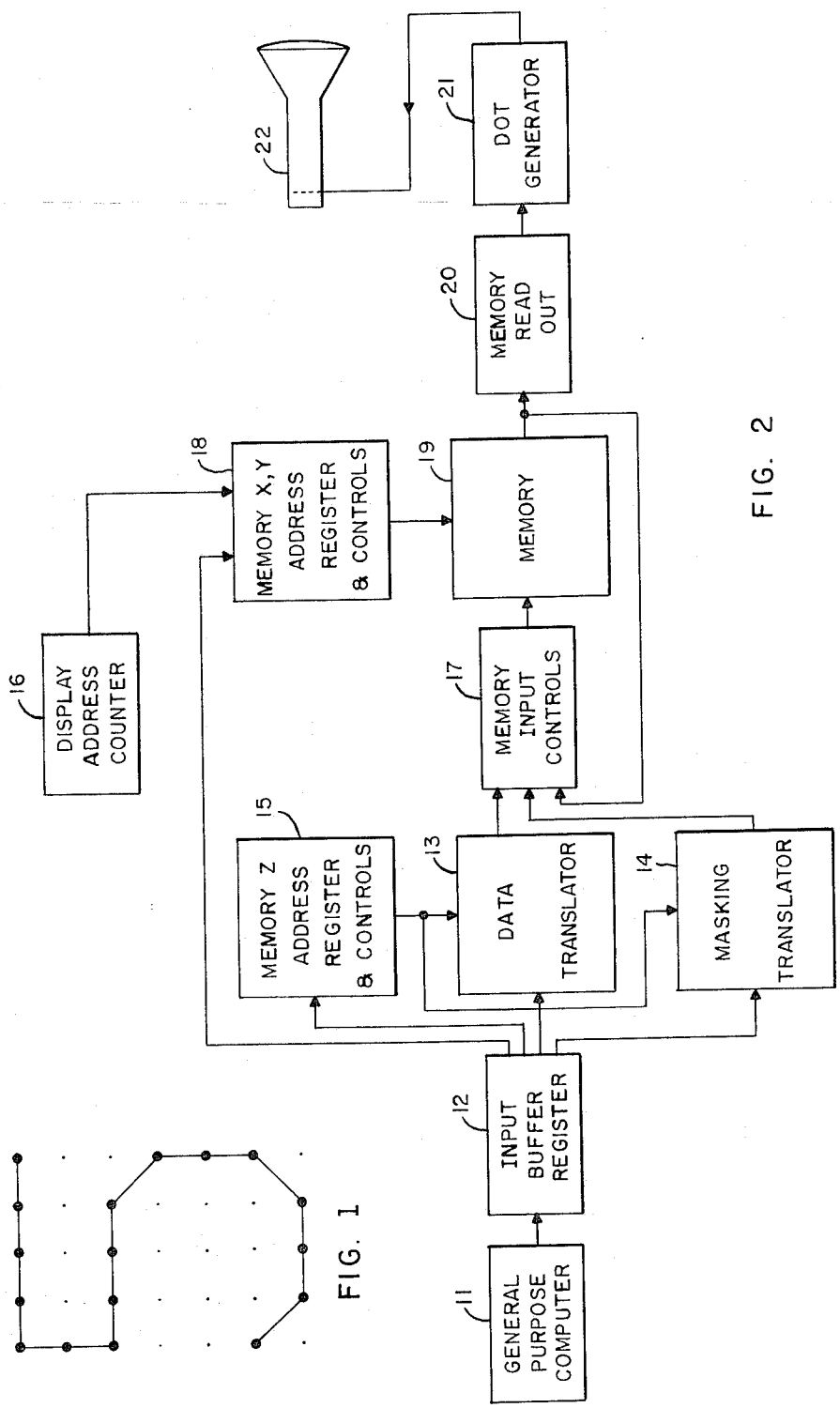

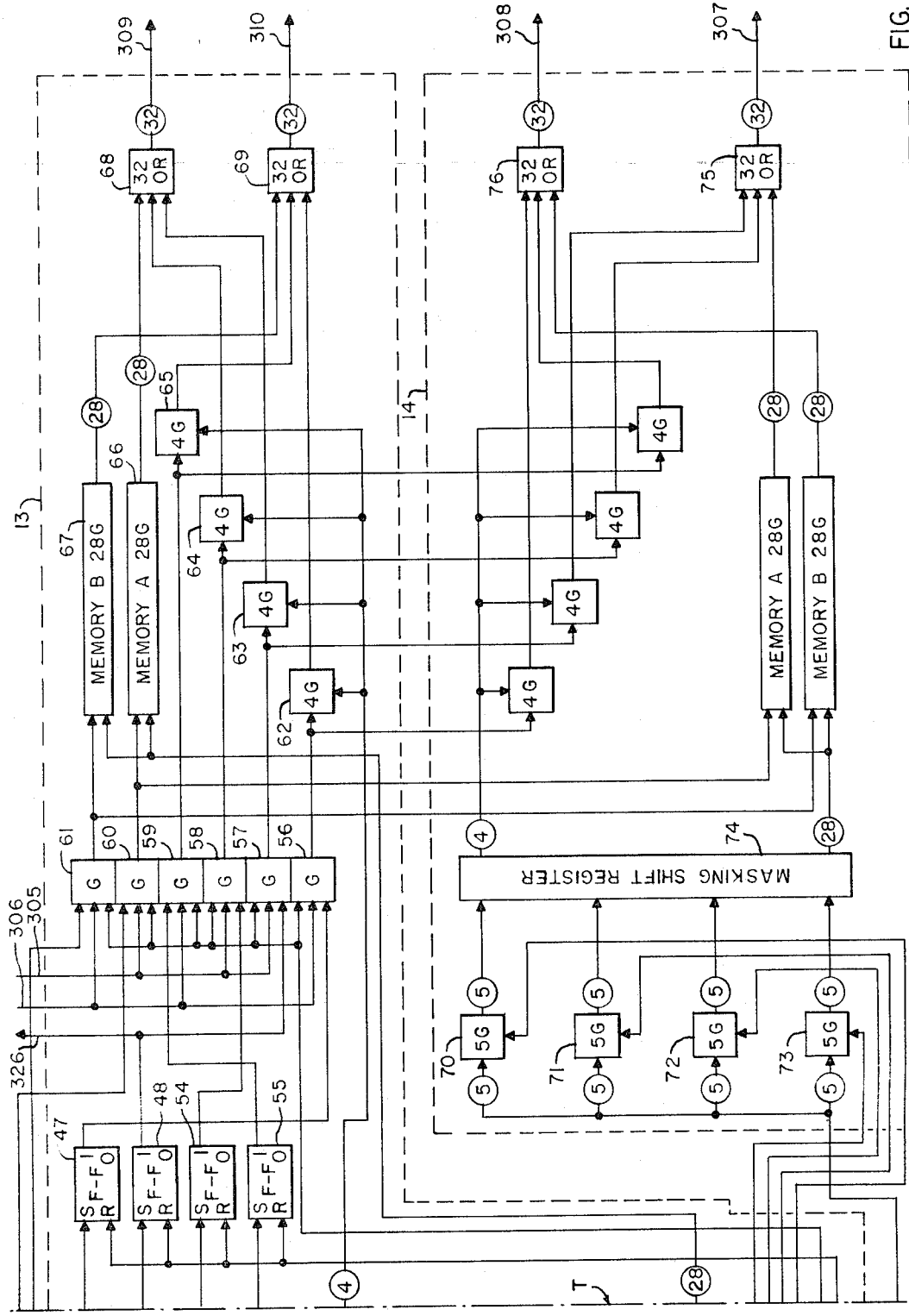

3,293,614
DATA CONVERTER SYSTEM
Gerald E. Fenimore, Mooresville, William R. McConnell, Plainfield, and Leland M. Nave, Indianapolis, Ind., assignors to Hazeltine Research, Inc., a corporation of Illinois
Filed Apr. 29, 1963, Ser. No. 276,295
16 Claims. (Cl. 340—172.5)

This invention relates to a data converter system for use in line scan display or recording systems where it is required to display or record a plurality of numbers, letters or other symbols at specific locations.

Although it is not to be construed as a limitation of the possible uses of the data converter, the most obvious use is in continuous data display systems. The advent of continuous data display systems, as opposed to intermittent data display systems, such as a radar display, has made it desirable to be able to display numbers, letters or other symbols with the items to be presented.

Prior systems for character display utilizing beam shaping or beam "wiggling" methods for character generation require complex auxiliary beam shaping or beam deflection systems and generally are not compatible with line scan systems contemplated by the present invention where it is desired to have the characters composed of a plurality of dot elements. A television raster is an example of a line scan display.

It is an object of the present invention, therefore, to provide a new and improved system for displaying a plurality of symbols, comprising numbers, letters or any other character, on a line scan type display.

It is a further object of the present invention to provide a new and improved system for displaying symbols on a line scan display with the number of symbols to be displayed at a given time is only limited by the number of symbols that can be accommodated on the display surface.

It is still a further object of the invention to provide a new and improved system of continuously updating the symbols to be displayed and their location on the display.

It is still a further object of the invention to provide a new and improved system for displaying such symbols on a line scan color display.

In accordance with the invention a data converter system in which information signals, such as binary coded information signals, representative of discrete symbols and their corresponding locations within a display area are converted to a second signal for reproduction in a line scan type display wherein the entire display area comprises a plurality of illuminable dot elements, comprises means for accepting the information signals and means for converting that part of the information signals representative of the symbols into the second signal in which each of the symbols are represented by a plurality of information bits corresponding to unique dot elements in the line scan display. The system also includes storage means having a separate storage element corresponding to each dot element in the entire display area and means for placing each information bit in the storage element that corresponds to the dot element at which it is to be displayed in accordance with that part of said information signals representative of the symbols' location. The system further comprises means for reading from the storage means the information bits at a rate corresponding to the rate at which they are to be presented on the line scan display.

For a better understanding of the present invention together with other and further objects thereof, reference is had to the following description taken in connection with the accompanying drawings, and its scope will be pointed out in the appended claims.

Referring to the drawings:

FIG. 1 is an example of a symbol formed in the dot matrix;

FIG. 2 is a block diagram of a data converter system construed in accordance with the present invention;

FIG. 3a and FIG. 3b is a block diagram of an input source, input buffer register, Z address register, data translator and masking translator to be used in a data converter as shown in FIG. 2;

Figure 3A:
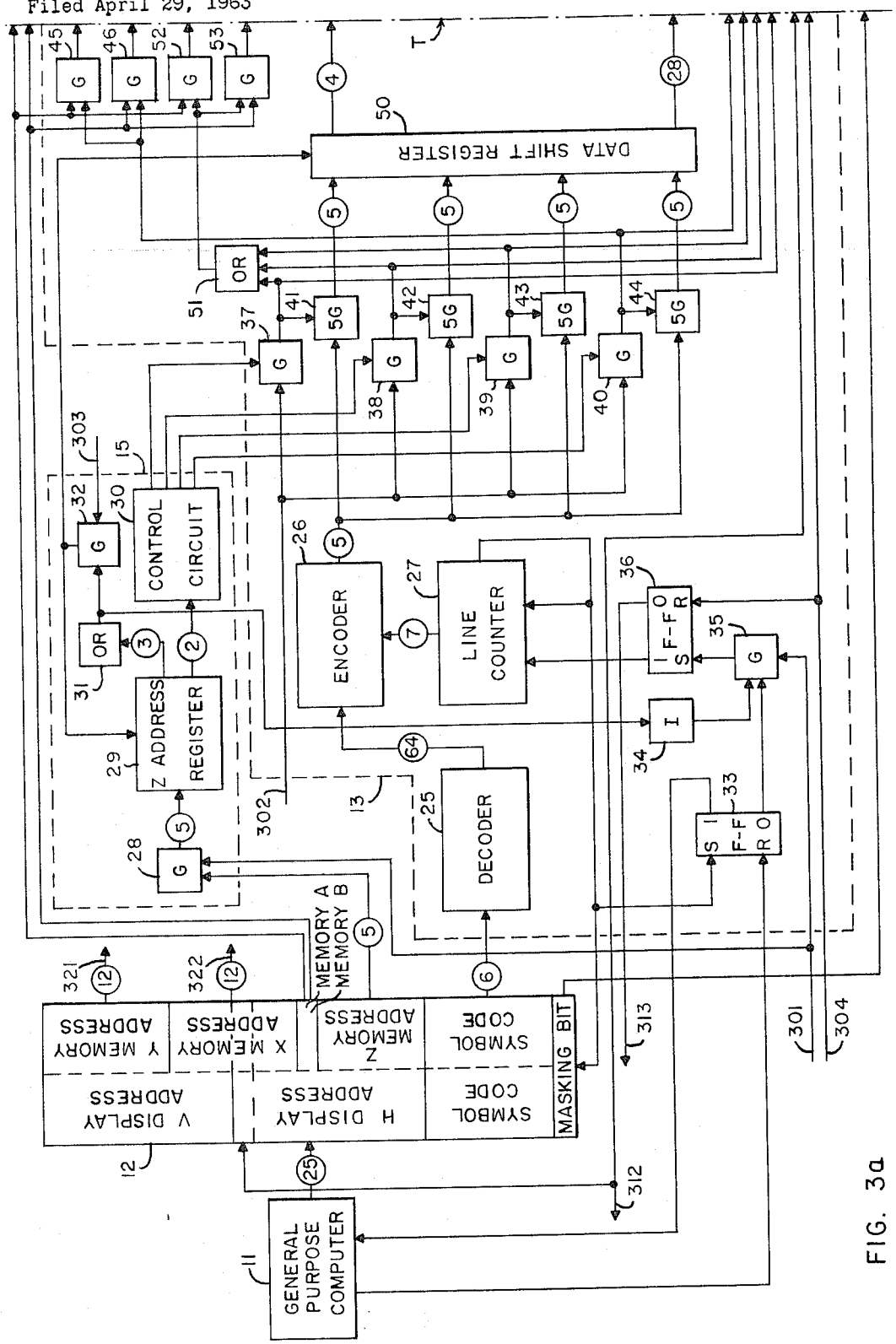

FIG. 1 shows an example of a symbol formed in a dot matrix format. Each dot represents a discrete point on a line of a line scan display. The symbol is formed on a display by reproducing this dot arrangement on the display. For instance, the number "5" shown in FIG. 1 would be reproduced on a television display by unblanking the video beam for each enlarged dot shown in FIG. 1. It would require seven television lines to reproduce the number "5" on the display. It will be appreciated that the size of the dot matrix is not limited to the 5 x 7 matrix shown, as any different size matrices could be used.

There is shown in FIG. 2 a block diagram of a basic data converter system constructed in accordance with the present invention in which information signals, for example, binary coded digital signals representative of discrete symbols and their corresponding locations within a display area are converted to a second signal for reproduction in a line scan type display. This includes an input buffer register 12 for accepting binary coded information signals from the general purpose computer 11 or any other source of binary coded information signals. As received, the binary coded information signal contains a portion representative of the symbol to be displayed, its two-dimensional display address and may also include an indication, known as a masking bit, which tells whether an existing symbol at this address is to continue to be displayed or masked. The data translator 13 converts that portion of the binary coded information signal representative of the symbols into a second signals in which each of the symbols are represented by a plurality of information bits corresponding to unique dot elements in a dot matrix, for example, the dot matrix shown in FIG. 1. The masking translator 14 converts that portion of the information signal representative of the masking information into a dot matrix format to be used in removing from memory, in a manner to be explained, the existing symbol information at the indicated location. The data information bits that comprise the second signal are positioned in the data translator 13 and the masking information bits are positioned in the masking translator 14 by the Z memory address register and controls 15 with respect to one axis of the memory 19. Memory input controls 17 combine the information bits from the data translator 13 with the recirculated information bits which have been read from memory 19. If the binary coded information signal has indicated that an existing symbol at this address is to be masked the information bits from the masking translator will inhibit the recirculated information bits. The symbol information bits and the recirculated information bits are placed in memory 19 according to the memory X, Y address registers and controls 18. The memory X, Y address is determined by that part of the binary coded information signal representative of the symbol locations. The memory 19 has the capacity to store an information bit for each corresponding dot element in the line scan display 22. The memory readout 20 reads out the information bits from the memory 19 at a rate corresponding to which they are to be presented on the display 22, which could be a cathode-ray tube. The dot generator 21 converts the information bits to video pulses for use in blanking and unblanking the video beam in the tube. In this manner the symbols are produced on the display in a dot matrix format.

The following discussion is a more detailed description of a data converter. Certain assumptions must be made for the purpose of this description, however, these assumptions are not to be construed as limitations on the data converter. It is assumed, for example, that the display system to be used in conjunction with the data converter is an 875 line interlaced display, which has 410 useful lines per field and 60 fields per second. Each display line contains 512 equally space dot elements. Therefore the memory device must have a capacity of at least 512×410=209,920 bits in order to store one information bit corresponding to each dot element for an entire field. The memory device to be used is actually two coincident current core memories, each being 64 x 64 x 32. With this arrangement the same information is presented in both fields of a frame. It is obvious that positive interlacing of symbols with the resultant better resolution could be obtained with a larger storage device. It is also assumed that the symbols to be displayed will be formed in a 5 x 7 dot matrix. It is further assumed for the purpose of this discussion that a single symbol is to be displayed at the given display address and that the number of different symbols to be displayed is 64. To simplify this discussion in the accompanying drawings multiple connections on the drawings are shown by a circled number within the connecting line. The circled number indicates the actual number of connections. A line with no number means there is a single connection betwen these points.

FIG. 3a and FIG. 3b is a block diagram showing in greater detail the portion of FIG. 2 including the input buffer register 12, the data translator 13, masking translator 14 and the Z memory address register and controls 15. The input buffer register 12 accepts the binary coded information signal from the general purpose computer 11. This information signal is a twenty-five bit binary word, nine bits to indicate one of 410 vertical display lines, nine bits to indicate one of 512 dot elements on a vertical line, six bits to indicate one of sixty-four symbols to be displayed and one masking bit. The nine bits of vertical display address (V) and the nine bits of horizontal display address (H) give the location of the upper left-hand dot of the dot matrix.

As shown in FIG. 2 the H and V display address are used to give the three-dimensional memory address at which the dot matrix will be stored in the memory device 19. As previously stated, the memory device 19 of FIG. 2 consists of two memories, each having sixty-four bits in Y, sixty-four bits in X and thirty-two bits in Y, sixty-four bits in X and thirty-two bits in Z. The six high order bits of the vertical display address are used to indicate the memory Y address. The three high order bits of the horizontal display address and the remaining three low order bits of the vertical display address are used to indicate the memory X address. The five low order bits of the horizontal display address are used to indicate the memory Z address. The sixth order bit of the horizontal display address determines in which of the two memories, memory A or memory B, the information is to be placed.

Each line of the display dot matrix into which symbol information is converted, which shall be subsequently shown, is placed into the memory separately. Since the information is read from memory for display in the same order it is to be displayed, the second line of the dot matrix must be entered into the memory the equivalent of one horizontal display line or 512 dot elements after the first line in order to have the second line of the dot matrix appear directly below the first line on the display. This is accomplished by coupling the set output of flip-flop 36 in FIG. 3a to the low order bit of the vertical display address, thereby advancing the low order bit one position after the first line of the dot matrix has been placed in memory. Since the low order bit of V display address is the same as the fourth order bit of X memory address, X memory address is advanced eight positions. Each X, Y memory address has 64 dot elements associated with it. Therefore advancing the X memory address by eight positions means the memory has been advanced 512 dot elements. Each succeeding line of the dot matrix is placed into the memory in the same order.

Figure 4A:
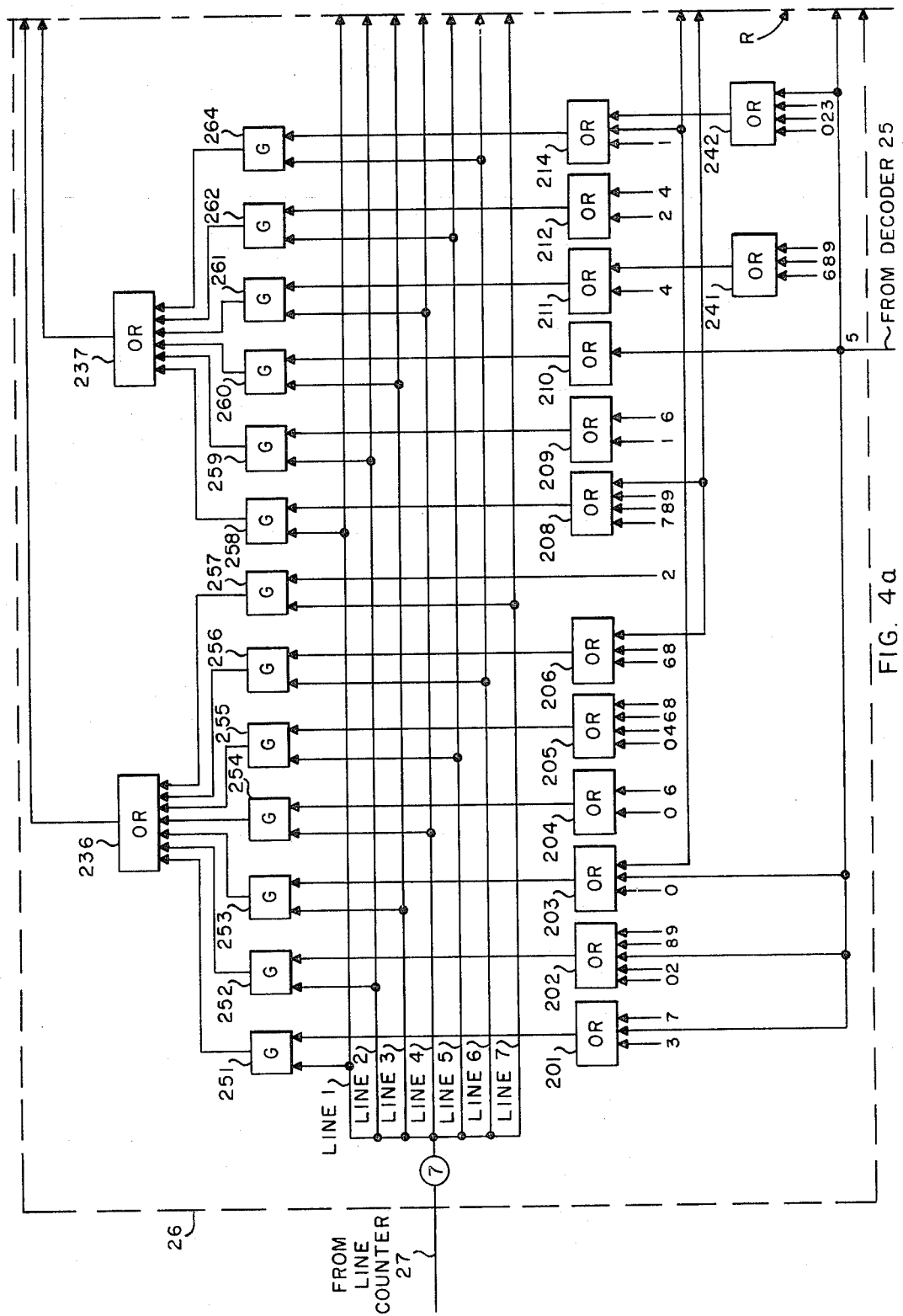
FIG. 4a and FIG. 4b is a block diagram of a typical encoder which could be used in a data translator shown in FIG. 3a and FIG. 3b.
Figure 4B:
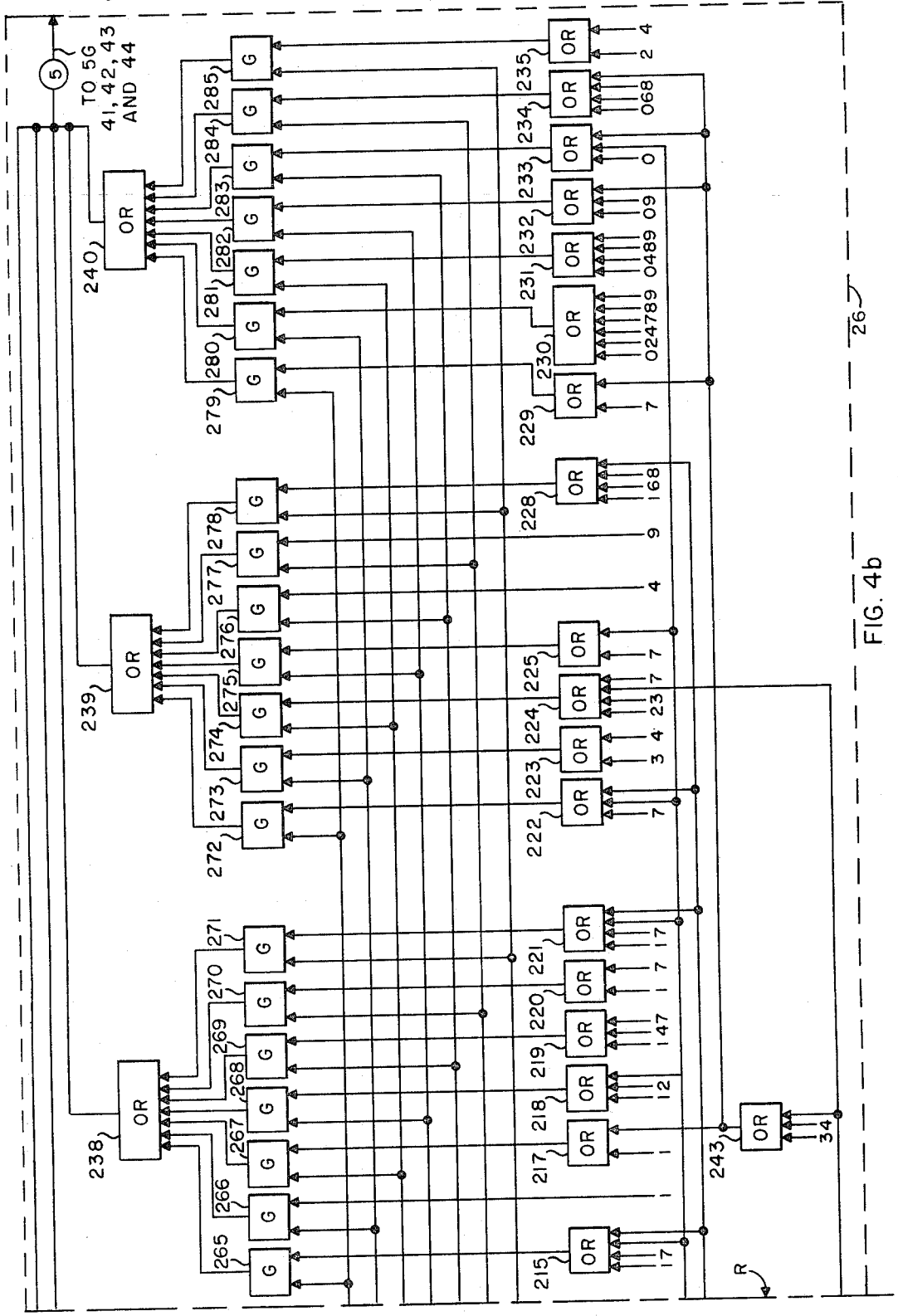

The six bits of the binary coded information signal that comprises the symbol information are coupled from the input buffer register 12 to the decoder 25. The decoder 25 may, for example, be a simple diode matrix causing one of 64 leads to the encoder 26 to be enabled for each binary coded input thereto. FIG. 4a and FIG. 4b is a block diagram of a simplified encoder which is only capable of forming the dot matrix for the numbers "0" through "9." However, the 64 symbol encoder would merely require more input OR circuits.

Assume the symbol indicated by the binary coded information signal is the number "5" as shown in FIG. 1. The decoder 25 would then enable the "5" lead to the encoder 26. This produces an output from OR circuits 201, 202, 203, 206, 208, 210, 214, 215, 217, 221, 222, 224, 228, 229, 232, 233, and 234 to provide enables to the corresponding GATES 251, 252, 253, 256, 258, 260, 264, 265, 267, 271, 272, 274, 278, 279, 282, 283 and 284. The other input to these GATES is from the line counter 27. This is an eight position counter which resets itself to position "1" on being stepped to position "8." Therefore, outputs are produced from GATES 251, 258, 265, 272, and 279 enabling OR circuits 236, 237, 238, 239 and 240. These five outputs correspond to the dot elements in the first line of the dot matrix for the number "5." After these five dot elements have been entered into memory the line counter is advanced one position, enabling line 2 and producing an output from OR circuit 236 via GATE 202. This output corresponds to the one information bit on the second line of the dot matrix for the number "5." Each succeeding line of information bits is produced in the same manner.

The five outputs of the encoder are coupled in parallel to normally closed GATE circuits 41, 42, 43 and 44. The Z address determines which of these GATES is enabled.

The five bits that comprise the Z address in the input buffer register 12 are coupled to normally closed GATE 28. When a group of information bits that comprise one line of the matrix is to be placed in memory the GATE 28 is opened by a write command clock pulse on lead 301 from the clock circuitry, thereby coupling the Z address into the Z address register 29. The generation of the write command clock pulse and all other clock pulses will be explained in the subsequent description of a clock cycle in FIG. 7 and FIG. 7a. The two high order bits are coupled from the Z address register to control circuit 30. One of the four outputs of control circuit 30 will be enabled thereby coupling an output to one of the four normally closed GATES 37, 38, 39 or 40. At the proper time in the cycle a strobe clock pulse is coupled by lead 302 to GATES 37, 38, 39 and 40 to open that GATE that has been enabled by the control circuit 30. The output of this GATE is coupled to its corresponding GATE 41, 42, 43, or 44 to open that GATE to allow the five outputs of the encoder 26 to be placed into the data shift register 50.

The three low order bits of the Z address are coupled from the Z address register 29 to normally closed GATE 32 via OR circuit 31. At the required times in the clock cycle the GATE is opened by shift clock pulses being coupled to lead 303 thereby providing shift pulses for the data shift register 50. The three bits from the Z address register will allow a maximum of seven shift pulses to be generated. Each shift pulse that is coupled to the data shift register 50 is also coupled back to the Z address register 29 where it is used as a subtraction pulse. When the number of shift pulses originally indicated by the three low order bits of the Z address register 29 have been produced the three low order bits of the Z address register will all be logical "0" thereby removing the enable to GATE 32. Any further shift clock pulses coupled to GATE 32 will not be coupled to the data shift register 50. The output of OR circuit 31 is also coupled to inverter 34 so that when the output from OR circuit 31 is logical "0" one of three inputs to GATE 35 is provided.

Figure 5:
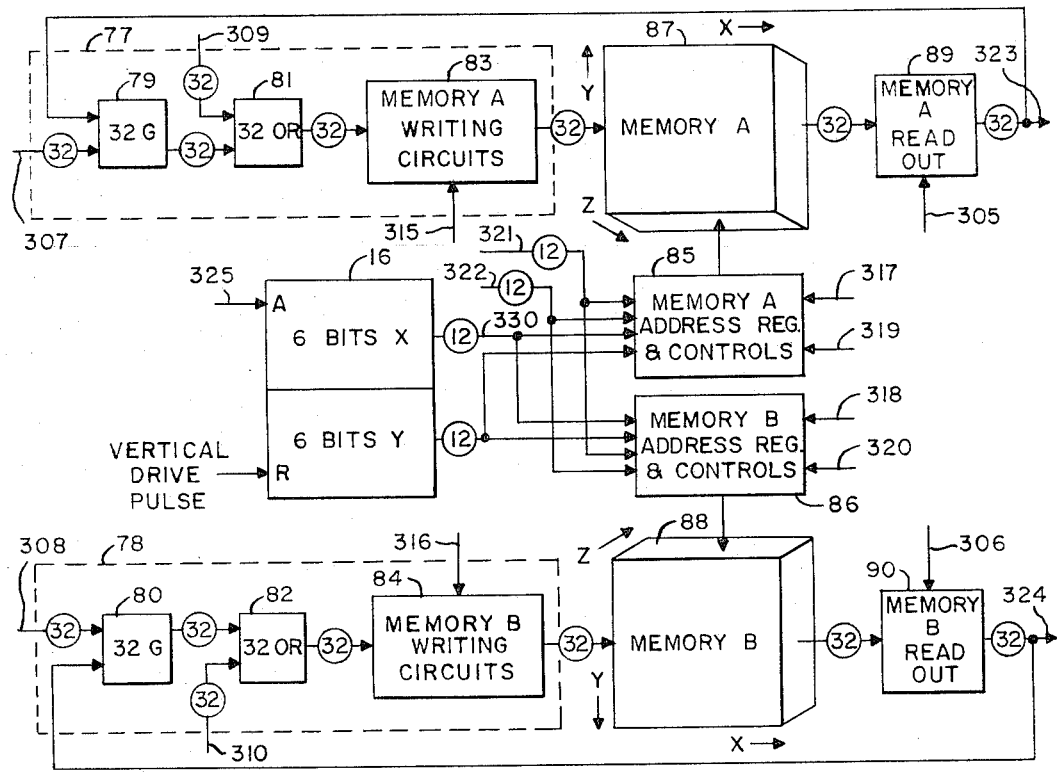
FIG. 5 is a block diagram of a display address counter, a memory, memory input controls, memory address register and controls and a memory readout shown in FIG. 2.

The data shift register 50 is a thirty-two stage shift register wherein each stage of the register corresponds to a specific storage point on the Z axis at any X, Y memory address for either memory A 87 or memory B 88 in FIG. 5. The information bits are located in the data shift register 50 by the Z address at the register stages that correspond to the point along the Z axis at which they are to be located. The input GATES to the data shift register 50 are arranged so that GATE 41 couples the outputs from the encoder 26 to the first through fifth stages of the data shift register 50, GATE 42 couples the outputs to the ninth through thirteenth stages, GATE 43 couples the outputs to the seventeenth through twenty-first stages and GATE 44 couples the outputs to the twenty-fifth through twenty-ninth stages. With the possibility of seven shift pulses, as previously stated, it is seen that the output of the encoder can be positioned at any point in the data shift register 50 and therefore at any point along a Z axis of the memory.

It was previously stated that the memory device is in fact two memories. Actually, it could be a single memory functionally divided into two sections, but for ease of discussion it will be considered to be two separate memories, memory A 87 and memory B 88, as shown in FIG. 5. When information is read from memory for display the information along the Z axis in memory A 87 at a particular X, Y address is read first, then the information along the Z axis in memory B 88 at the same X, Y address is read. The address is stepped one position in X and the process repeated. Since the information must be placed into the memory in the same order in which it will be read from memory logic must be provided in the data translator 13 to allow for the case where part of the output from the encoder 26 is to be loaded into one memory and the other part into the other memory. For instance, if the output of the encoder 26 was placed in the data shift register 50 via GATE 44 and shifted seven times, the first bit from the encoder 26 would be located in the thirty-second stage of the data shift register 50 and the last four bits would be recirculated and located in the first four stages of the shift register. However, these four bits would have to be loaded into a different memory than the bit in the thirty-second stage.

The outputs of GATES 37, 38, and 39 are coupled to OR circuit 51. If one of these three GATES is the GATE enabled by the control circuit 30 then there can be no overflow from memory A 87 to memory B 88 or vice versa. So these three GATES are used to indicate a no overflow condition. The output of OR circuit 51 is coupled to normally closed GATES 52 and 53. The other inputs to these GATES are the indications from the input buffer register 12 whether the information is to be loaded into memory A 87 or memory B 88. These indications are mutually exclusive and only one of the two GATES 52 or 53 will be enabled. The output of this GATE is coupled to its corresponding flip-flop 54 or 55 to place it in the set condition. These flip-flops are reset by a cycle reset pulse being coupled to the flip-flop by lead 304 each time a line of a dot matrix has been placed into memory. If GATE 40 is the GATE enabled by the control circuit 30 there is a possibility of an overflow from memory A 87 to memory B 88 or vice versa. The output of GATE 40 is coupled to GATES 45 and 46. The other inputs to these GATES are the same as the GATES 52 and 53 and again, only one of these GATES can be enabled. The output of this GATE is coupled to its corresponding flip-flop 47 or 48 to place it in the set condition. These flip-flops are also reset by the cycle reset pulse.

The outputs of flip-flops 47, 48, 54 and 55 are coupled to corresponding three input normally closed GATES 56, 57, 58 and 59. The indications from the input buffer register 12 whether the information is to be loaded into memory A 87 or memory B 88 are coupled to three input normally closed GATES 60 and 61, respectively. When a line of the dot matrix is to be written into memory, flip-flop 36 is placed in the set condition by GATE 35 being enabled. Flip-flop 33 is in the reset state indicating binary coded information has been received from the general purpose computer 11. There is an output from inverter 34 indicating the required shift pulses have been generated and at the proper time a write command clock pulse is applied to lead 301 providing a set pulse to flip-flop 36. The output of flip-flop 36 is coupled to GATES 56, 57, 58, 59, 60 and 61 to indicate the information bits generated by the encoder 26 are to be placed into memory. The third input to these GATES is a clock pulse from the clock circuitry. A read strobe A clock pulse is applied to lead 305 to enable GATES 57, 58 and 60. After the required information bits have been placed into memory A 87 a read strobe B clock pulse is applied to lead 306 to enable GATES 56, 59 and 61. For any line of the dot matrix placed into memory only two of these GATES 56, 57, 58, 59, 60 or 61 are enabled. For example, if the information is to be loaded into memory A 87 with an overflow into memory B 88 there would only be an output from GATES 56 and 60. If the information is to be loaded into memory A 87 with no overflow into memory B 88 there would only be an output from GATES 58 and 60. The outputs of GATES 56, 57, 58, 59, 60 and 61 are coupled to the corresponding normally closed GATES 62, 63, 64, 65, 66 and 67. The other input to GATES 62, 63, 64, and 65 is the information contained in the first four stages of the data shift register 50. The other input to GATES 66 and 67 is the information contained in the last twenty-eight stages of the data shift register 50. In the previous example where the information was to be loaded into memory A 87 with an overflow into memory B 88 GATE 66 would be opened allowing the information in the last twenty-eight stages of the data shift register 50 to be coupled to the memory A input controls 77 via OR circuit 68. When this information has been placed into memory A 87 GATE 62 would be opened allowing the information in the first four stages of the data shift register 50 to be coupled to the memory B input controls 78 via OR circuit 69.

Each succeeding line of the dot matrix is generated in the same manner. When one line has been entered into memory the line counter 27 is advanced one position, the Z address is strobed back into the Z address register 29 and the next line of the matrix is generated. When the line counter 27 is stepped to line 8 it automatically resets itself to line 1 and at the same time applies a reset pulse to clear the input buffer register 12. This line 8 output also places flip-flop 33 in the set condition. The set output of flip-flop 33 is coupled to the general purpose computer 11 to indicate the data converter is ready to accept the next binary coded information signal.

At the same time the data information is being generated by the data translator 13 the masking information is generated by the masking translator 14. The masking information, known as the masking bit, is coupled from the input buffer register 12 to GATES 70, 71, 72 and 73. If there is to be masking of the recirculated information from the memory this masking bit is a logical "1." This masking information is then placed into the masking shift register 74 and processed for use in the memory A 77 and memory B 78 input controls at the same time and in the same manner as the data information is processed in the data translator 13. If there is to be masking the outputs of OR circuits 75 and 76, which are coupled to memory A input controls 77 and memory B input controls 78 are logical "0's." If there is to be no masking these outputs are logical "1's."

FIGURE 5 is a block diagram showing in more detail the portion of the FIG. 2 data converter including the display address counter 16, the memory input controls 17, the memory X, Y address registers and controls 18, the memory 19 and the memory readout 20. As previously stated, the memory is to be considered as two memories, memory A 87 and memory B 88. Each memory will have separate associated circuitry except for the display address counter 16. In other words memory A 87 has memory A input controls 77, memory A address registers and controls 85 and memory A readout 89, while memory B 88 has memory B input controls 78, memory B address register and controls 86 and memory B readout 90.

Masking information is coupled from OR circuits 75 and 76 in FIG. 3b to the corresponding normally closed GATES 79 and 80 by leads 307 and 308. If there is to be no masking these inputs are logical "1's," GATES 79 and 80 are opened and the recirculated information from memory readouts 89 and 90 is allowed to pass through. If there is to be masking five of the thirty-two inputs as determined by the Z address are logical "0's," the corresponding five recirculated information bits are inhibited and since they were destroyed when read from memory they are now removed from memory. The information bits from the OR circuits 68 and 69 of the data translator 13 are coupled to OR circuits 81 and 82 by leads 309 and 310 where the data information is combined with the recirculated information read from memory, if it has not been masked, and coupled to the memory writing circuits 83 and 84. The memory writing circuits 83 and 84 are well-known devices, consisting of buffer registers, inhibit drivers and gates. If the data converter is in a display cycle only the recirculated information from the memory readout devices 89 and 90 is coupled to the memory writing circuits 83 and 84 and this information is placed into memory at the address indicated by the display address counter 16. Each memory readout device includes thirty-two sense amplifiers, one sense amplifier for each bit along a Z axis. If the system is in a data entry cycle then the data information and the recirculated information are placed into memory at the address indicated by the binary coded information signal contained in the input buffer register 12.

Figure 5A:
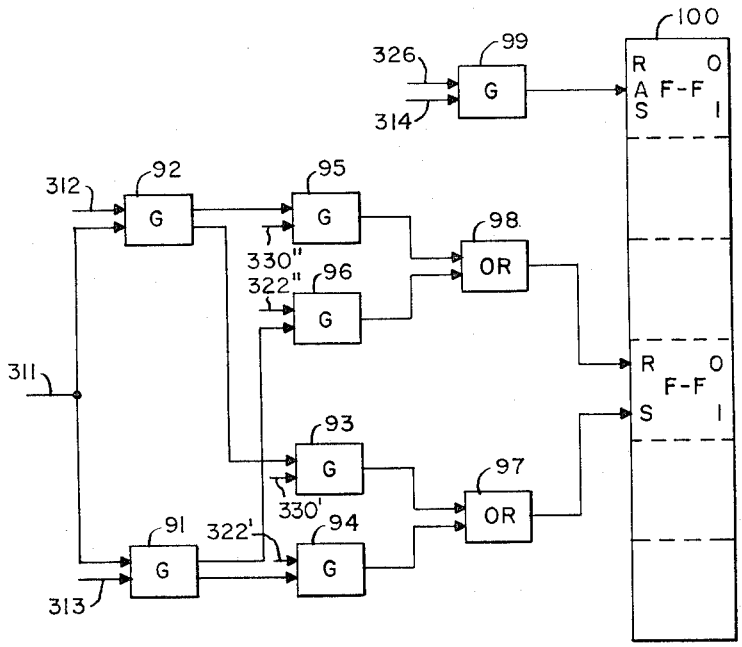
FIG. 5a is a block diagram of the memory address register loading circuitry to be used in memory address registers and controls shown in FIG. 5.

FIG. 5a shows a block diagram of a loading circuitry for the memory A address registers. Loading of each bit of the address into each stage of the register for the X, Y registers is the same as for the stage shown. The control inputs to GATES 91 and 92 which determine if the system is in a display cycle or a data entry cycle are the set and reset outputs of flip-flop 36 in FIG. 3a which are coupled to GATES 91 and 92 by leads 312 and 313. If the system is in a data entry cycle flip-flop 36 is in the set condition and a logical "1" is supplied to GATE 91 and a logical "0" to GATE 92. If the system is in a display cycle the reverse is true. The second input to these GATES is the memory A strobe address clock pulse supplied on lead 311. Assuming the system is in a data entry cycle the output of GATE 91 is coupled to normally closed GATES 94 and 96. The other inputs to these GATES supplied by leads 322' and 322" are the set and reset outputs of one stage of the memory address contained in the input buffer register 12 and therefore one bit of the address from the input buffer register 12 is entered into one stage of the address register 100 via OR circuits 97 and 98. Leads 322' and 322" are two of the twelve connections of lead 322 in FIG. 5. Both the set and reset conditions of each information bit in the input buffer register 12 are entered into the address register 100 so that the address register will not have to be reset each time a new address is to be entered. If the system is in a display cycle the output of GATE 92 is coupled to normally closed GATES 93 and 95. The other inputs to these GATES supplied by leads 330' and 330" are the set and reset outputs of one stage of the memory address contained in the display address counter 16 and therefore one bit of the address from the display address counter 16 is to be entered into one stage of the address register 100 via OR circuits 97 and 98. Leads 330' and 330" are two of the twelve connections of lead 330 in FIG. 5. If there is an overflow from memory B 88 to memory A 87 the memory A address must be advanced one position to place the information in the memory so it will be read out in proper sequence for display. Therefore, if flip-flop 48 in FIG. 3b is in the set condition indicating an overflow from memory B to memory A a logical "1" is supplied to GATE 99 by lead 326. At the proper time in the clock cycle a memory A address advance clock pulse is applied to GATE 99 by lead 314 and coupled through to the first stage of the X address register to advance it one position.

Other than GATE 99 the A memory X and Y address register loading circuits are the same. The A memory Y address register loading circuit is also similar to the B memory X and Y address register loading circuits the only difference being the memory B strobe address clock pulse occurs at a difference time in the clock cycle than the memory A strobe address clock pulse.

The display address counter 16 consists of two six bit binary counters. The X counter is stepped once each clock cycle by the display counter address clock pulse coupled to it by lead 325. When the X counter is full the next pulse resets it to zero and advances the Y counter one position. Both counters are reset once each display field by the vertical drive pulse.

The information to be entered into the memory is placed in the memory in the standard manner. Thirty-two bits of information are entered in parallel along a Z axis at a particular X, Y address. The information is strobed from the memory writing circuits 83 and 84 by the inhibit trigger clock pulse coupled to the memory circuits by leads 315 and 316 and, at the same time, the memory addressing circuits are strobed by the write trigger clock pulse coupled to the memory addressing circuits by leads 317 and 318. The information is read from the memory by the sense amplifiers 89 and 90 in a similar manner. Thirty-two bits of information are read from the memory in parallel along a Z axis for each X, Y address. The information is strobed from the memory to the memory readout devices 89 and 90 by the read trigger clock pulse, coupled to memory addressing circuits by leads 319 and 320, and peaked at the memory readout devices 89 and 90 by the read strobe clock pulse coupled to the memory readout devices by leads 305 and 306.

Figure 6:
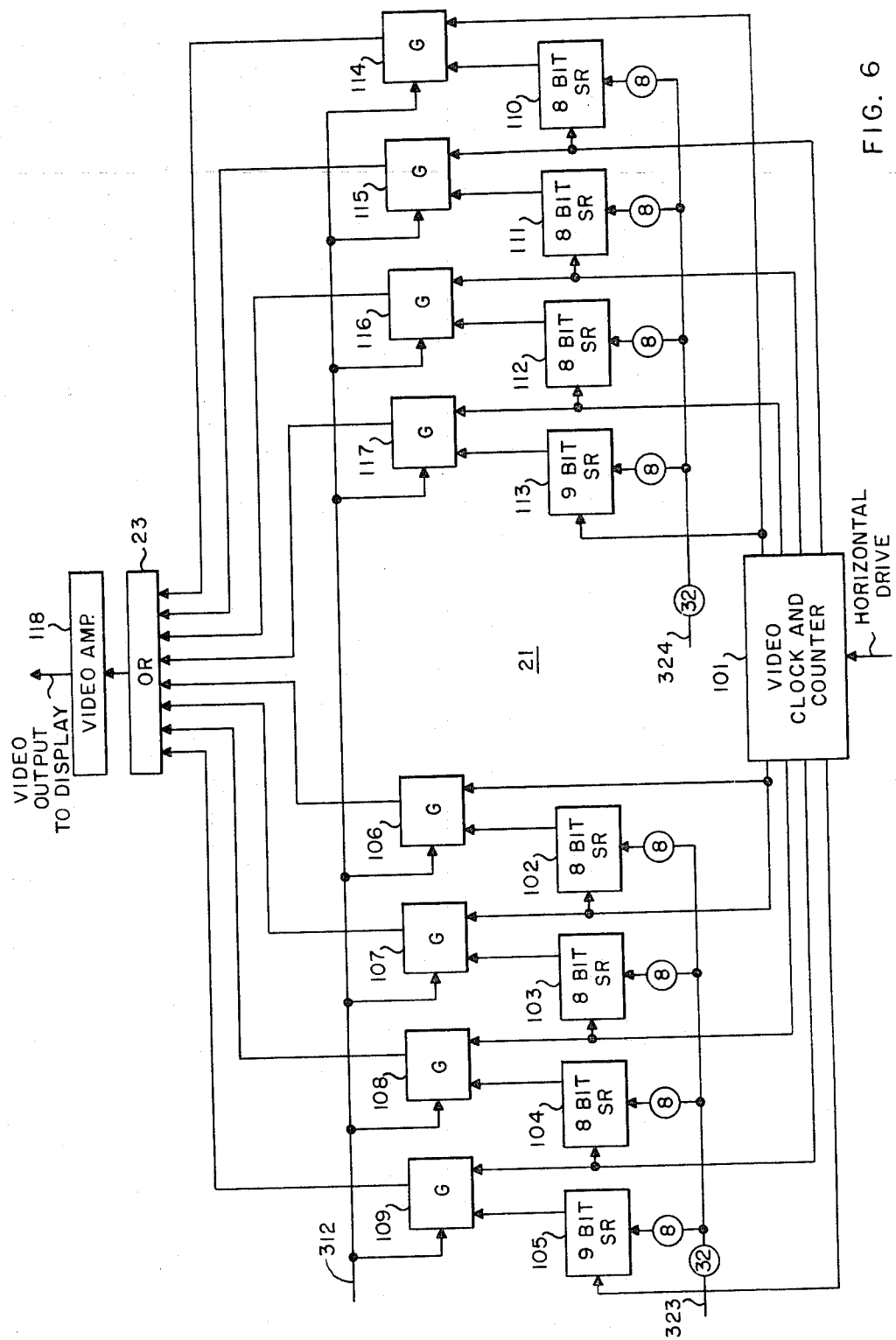
FIG. 6 is a block diagram of a dot generator shown in FIG. 2.

FIG. 6 is a block diagram of a dot generator 21. The information from the memory readout devices 89 and 90 is coupled to the shift registers by leads 323 and 324; from memory A readout device 89 to shift registers 102, 103, 104 and 105 and from memory B readout device 90 to shift registers 110, 111, 112 and 113. The memory readout devices are coupled to the shift registers so that the information is transmitted in parallel but the leads are arranged so that the succeeding bits are entered in alternate shift registers. For example, the first information bit from the memory A readout device 89 is entered into the first stage of shift register 102. The second bit is entered into the first stage of shift register 103. The third information bit is entered into the first stage of shift register 104. The fourth information bit is entered into the second stage of shift register 105. The reason for this will be subsequently explained. The fifth information bit is entered into the second stage of shift register 102. Each succeeding bit is entered in a similar order. The first stage of each shift register is coupled to a corresponding three input normally closed GATES 106, 107, 108, and 109. The second inputs to GATES 106, 107, 108, and 109 is the reset side of flip-flop 36 in FIG. 3a so that if the system is in a data entry cycle GATES 106, 107, 108, and 109, will be inhibited and there will be no output. The third input to these GATES is from the video clock and counter 101. This clock is a 17 megacycle clock that is synchronized by the display horizontal drive so that it only provides outputs during the active horizontal line time. The 17 megacycle rate is necessary since each clock pulse is used to produce one information bit from GATES 106, 107, 108, and 109 for display. The clock is connected to the GATES in such a way that the first clock pulse is coupled to GATE 106, the second clock pulse is coupled to GATE 107, the third clock pulse is coupled to GATE 108, etc. In this way the information bits are sequentially coupled to the video amplifier via OR circuit 23 in the same order as they were parallely loaded into the shift registers. Each clock pulse also acts as a shift pulse for the preceding shift register. The first clock pulse, coupled to GATE 102, is also coupled to shift register 105 to shift it one position. The second clock pulse, coupled to GATE 103, is also coupled to shift register 102 to shift it one position, and so on. It is seen that the first clock pulse will shift shift register 105 one position before the first information bit has been strobed out of GATE 109. That is why the fourth information bit from the memory readout devices is loaded into the second stage of shift register 105.

While information bits are being produced from GATES 102, 103, 104, and 105, a group of thirty-two information bits is being loaded into shift registers 110, 111, 112, and 113 from the memory B readout device 90, in the same manner as the information bits were loaded into shift registers 102, 103, 104, and 105 from the memory A readout device 89. After the video clock 101 has generated thirty-two pulses, as determined by the counter, the clock outputs are shifted to GATES 114, 115, 116, and 117 and the information bits are produced from these gates in the same manner as they were produced from GATES 106, 107, 108, and 109. The video amplifier 118 merely serves to amplify information bits for use in the display.

Figure 7:
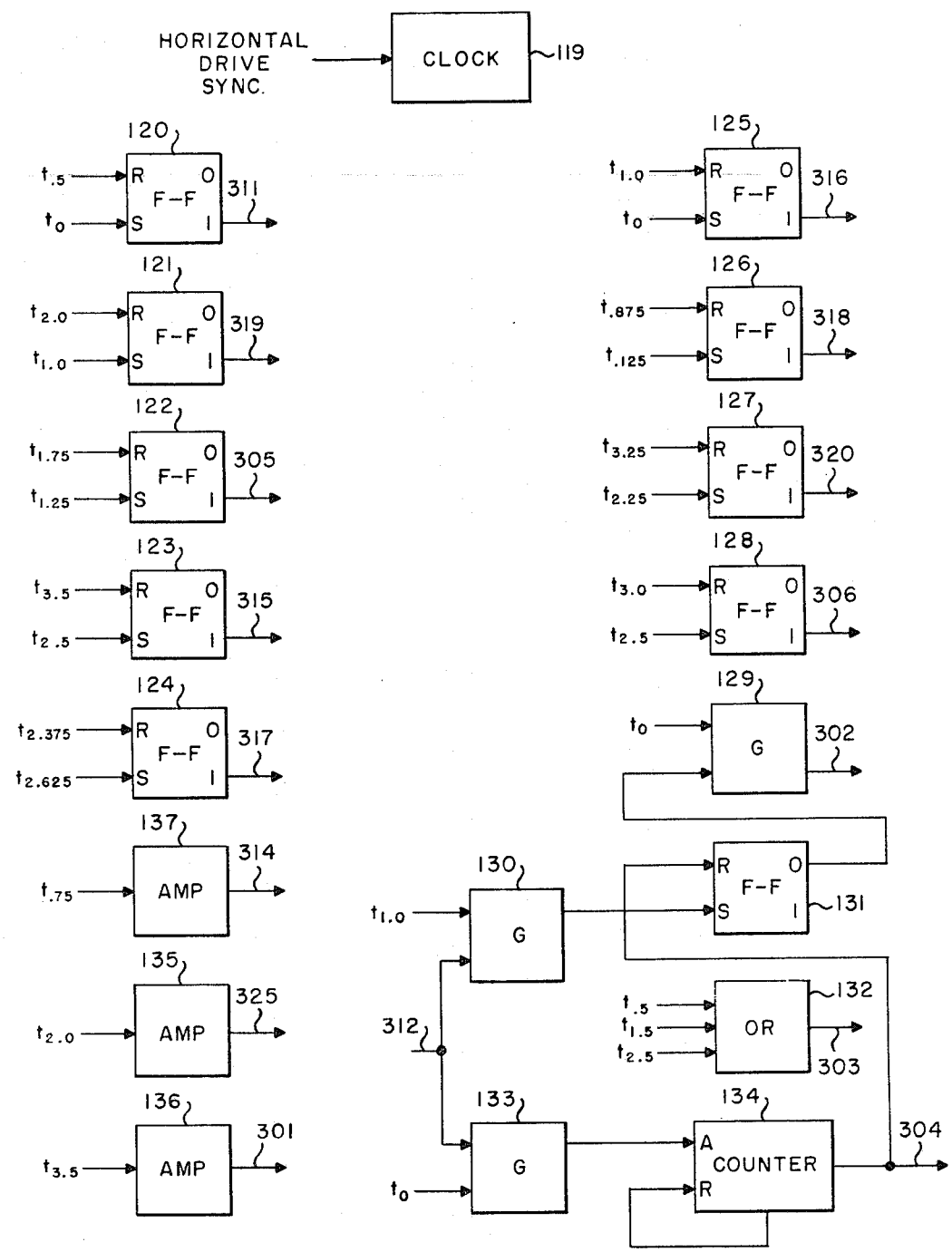
FIG. 7 and FIG. 7a is a block diagram of a master clock and its associated pulse generating circuitry.
Figure 7A:
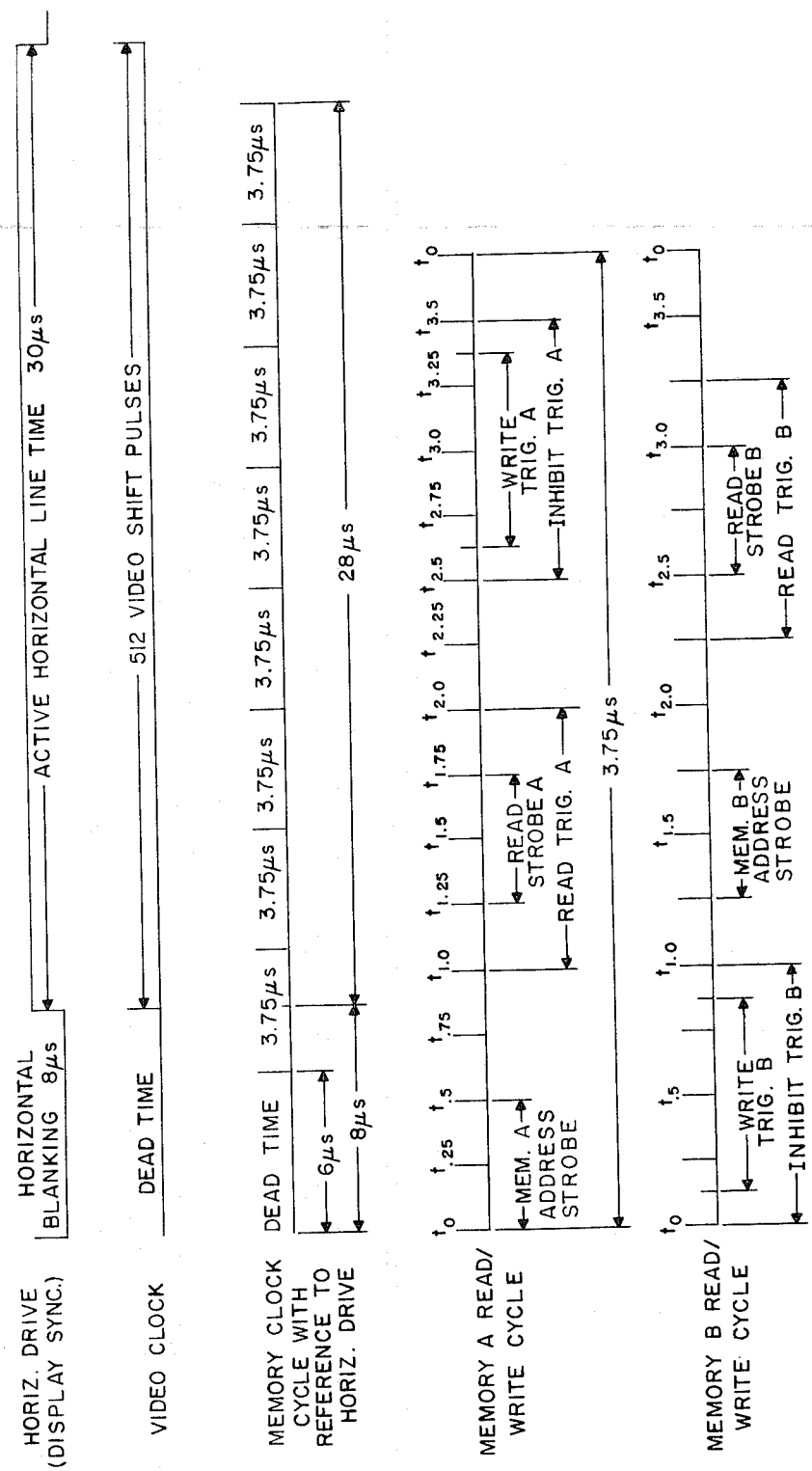

FIG. 7 is a block diagram representation of the master clock 119 and its associated circuitry. FIG. 7a shows the timing of the master clock 119 and the video clock 101. As shown in FIG. 7a video pulses are only produced during the active horizontal line time. Each read/write cycle of the master clock 119 takes 3.75 microseconds. The master clock is synchronized by the display horizontal drive sync in such a way that it is gated on two microseconds before active horizontal line time and therefore the last read/write cycle will end two microseconds before the end of active horizontal line time. For the further discussion of an individual read/write cycle it is assumed that the system is in a display read/write cycle. A memory A address strobe pulse is developed by setting and resetting flip-flop 120 with the $t_0$ and $t_{.5}$ outputs of the master clock. The output of flip-flop 120 is coupled to GATES 91 and 92 in FIG. 5a by lead 311. Since the system is in a display cycle GATES 93 and 95 are enabled and the address from the display address counter 16 is entered into the memory A address registers. An inhibit trigger B pulse is developed by setting and resetting flip-flop 125 with the $t_0$ and $t_{1.0}$ outputs of the clock. The output of flip-flop 125 is coupled to memory B writing circuits 84 in FIG. 5 by lead 316. A write trigger B is developed by setting and resetting flip-flop 126 with the $t_{.125}$ and $t_{.875}$ outputs of the clock. The output of flip-flop 126 is coupled to the memory B address registers and controls 86 by lead 318. In this way, since the memory B address registers have not yet been advanced, the recirculated information read from memory during the last clock cycle of the preceding active horizontal line time is placed back into memory at the same address from which it was read out. A read trigger A pulse is developed by setting and resetting flip-flop 121 with the $t_{1.0}$ and $t_{2.0}$ outputs of the master clock. The output of flip-flop 121 is coupled to the memory A address registers and controls 85 by lead 319. A read strobe A pulse is developed by setting and resetting flip-flop 122 with the $t_{1.25}$ and $t_{1.75}$ outputs of the clock. The output of flip-flop 122 is coupled to the memory A readout device 89 by lead 305. In this way the information bits contained along the Z axis at the X, Y address strobed into the memory A address registers by the memory A address strobe pulse are read out by the memory A readout device 89 and coupled to the dot generator 21. The output of flip-flop 122 is also coupled to GATES 91 and 92 in FIG. 5a as a memory B strobe address pulse and the address from the display address counter 16 is entered into the memory B address registers. A display counter advance clock pulse is developed by amplifying the $t_{2.0}$ output of the clock in amplifier 129 and coupling the output to the display address counter 16 by lead 324 to advance the display address one position. A read trigger B pulse is developed by setting and resetting flip-flop 127 with the $t_{2.25}$ and $t_{3.25}$ outputs of the clock. The output of flip-flop 127 is coupled to the memory B address registers and controls 86 by lead 320. A read strobe B pulse is developed by setting and resetting flip-flop 128 with a $t_{2.5}$ and $t_{3.0}$ outputs of the clock. The output of flip-flop 128 is coupled to the memory B readout device 90 by lead 306. In this way the information bits contained along the Z axis at the X, Y address strobed into the memory B address registers by the memory B address strobe pulse are read out by the memory B readout device 90 and coupled to the dot generator 21. This X, Y address is the same as the X, Y address at which the memory A readout device 89 read the information bits from. An inhibit trigger pulse A is developed by setting and resetting flip-flop 123 with the $t_{2.5}$ and $t_{3.25}$ outputs of the clock. The output of flip-flop 123 is coupled to the memory A writing circuits 83 by lead 315. A write trigger A pulse is developed by setting and resetting flip-flop 124 with the $t_{2.625}$ and $t_{3.375}$ outputs of the clock. The output of flip-flop 124 is coupled to the memory A address registers and controls 85 by lead 317. In this way the recirculated information bits read from memory by read trigger A and read strobe A pulses are read back into memory A 87 at the same address from which they were read.

As seen in FIG. 8b this process is repeated eight times each active horizontal line time. Since sixty-four information bits are read from memory and processed each clock cycle 512 information bits are read from memory and processed each active horizontal line time.

It is now assumed that a binary coded information signal has been received by the input buffer register 12 to be entered into the memory. Since it takes a finite time to process each line of information bits generated by the encoder 26 and system remains in a display cycle while each line of information bits are being processed. Therefore, the memory A address strobe pulse will strobe the address from the display address counter 16 into the memory A address register and a new display cycle is begun. However, the $t_0$ output of the clock is coupled to normally closed GATE 129 to generate a strobe pulse which is coupled to GATES 37, 38, 39, and 40 in FIG. 3a by lead 302, to strobe the first line of the dot matrix from the encoder 26 into the data shift register 50. The enabling input to GATE 129 is the reset side of flip-flop 130 which has been placed in the reset condition by the previous cycle reset. Flip-flop 130 is placed in the set condition by GATE 131 which is enabled by the first $t_{1.0}$ pulse after flip-flop 36 has been placed in the set condition. This prevents subsequent $t_0$ pulses from reloading the data information into the data shift register 50 until a cycle reset has been generated. The $t_{.5}$, $t_{1.5}$, and $t_{2.5}$ outputs of the master clock are coupled to OR circuit 132 to provide shift pulses for the data shift register 50. If the information is to be shifted seven times it will take three clock cycles before the information is ready for entry into the memory. When information has been shifted the required number of times a logical "1" is coupled to GATE 35 in FIG. 3a by inverter 34. The third input to GATE 35 is the write command clock pulse which is developed by amplifying the $t_{3.5}$ output of the clock in amplifier 136. The output of amplifier 136 is coupled to GATE 35 by lead 301 and therefore, at $t_{3.5}$ GATE 35 is enabled and flip-flop 36 is placed in a set condition. The next memory A address strobe pulse will then enter the address from the input buffer register 12 into the memory A address registers. A memory A address advance pulse is developed by amplifying the $t_{.75}$ output of the clock in amplifier 137. The output of amplifier 137 is coupled to GATE 99 in FIG. 5a by lead 314 and if there is an overflow from memory B to memory A GATE 99 is enabled and the A memory X address register is advanced one position. The data entry cycle now continues as a display cycle except the read strobe A pulse is coupled to GATES 57, 59 and 60 in FIG. 3b to strobe the data information into the memory A input controls 77 at the same time the recirculated information from the memory A readout device 89 is strobed into the memory A input controls 77. The inhibit trigger A clock pulse and write trigger A clock pulse will now place into memory the recirculated information and the data information. Similarly, the memory B address strobe pulse will enter the address from the input buffer register 12 into the memory B address registers. The read strobe B pulse is coupled to GATES 56, 58 and 61 in FIG. 3b to strobe the data information into the memory B input controls 78 at the same time the recirculated information from the memory B readout device 90 is strobed into the memory B input controls 78. A cycle reset pulse is generated by the second $t_0$ pulse that occurs after flip-flop 36 in FIG. 3a has been enabled. The set side of flip-flop 36 and the $t_0$ output of the master clock are coupled to GATE 133. The output of GATE 133 is coupled to the counter 134. The second $t_0$ input resets the counter and produces a cycle reset output from the counter. Cycle reset pulse resets all the data entry flip-flops and returns the system to a display cycle.

Figure 8:
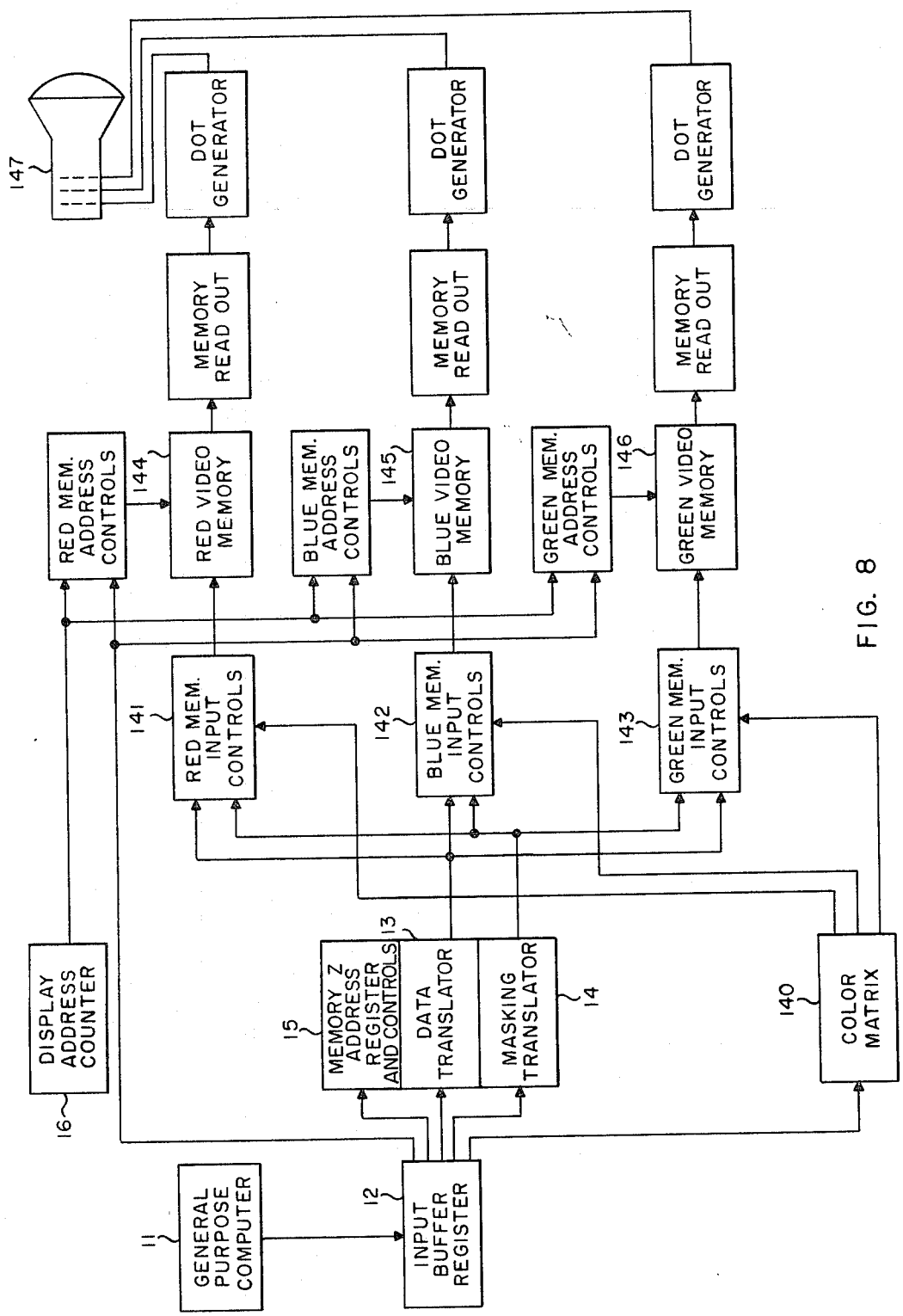
FIG. 8 is a block diagram of a data converter system to be used with a color display system construed in accordance with the present invention.

FIG. 8 is a block diagram presentation of a data converter system to be used with a color display system. The binary coded information signal is the same as the binary coded information signal used in the monochrome system shown in FIG. 2, except there are three additional bits to indicate symbol color. These three color bits are coupled to a color matrix 140. The color information to the color matrix 140 will cause any combination of three output leads to be enabled.

The Z memory address register and control 15, data translator 13, and masking translator 14 operate exactly the same as in the monochrome system. The information bits from the data translator 13 and masking translator 14 however, are coupled to three separate memory input controls, red memory input controls 141, blue memory input controls 142 and green memory input controls 143, which are coupled to three separate memories, the red memory 145, the green memory 146 and the blue memory 147. (Each memory may consist of two memories, memory A and memory B, as in the monochrome system.) The outputs of the color matrix will determine into which memory or memories the information is to be placed. If the output color information indicates the information is to be displayed in red, the red lead of the color matrix is enabled and the red memory input controls 141 are enabled. The green memory input controls 142 and the blue memory input controls 143 are inhibited.

The information is read from each memory in the same manner as in the monochrome system of FIG. 2. The output of each dot generator is coupled to a separate control grid in the color display. The symbol is thereby displayed in the color indicated by the input color information.

While there have been described what at present are considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A data converter system in which information signals representative of discrete symbols and their corresponding locations within a display area are converted to a second signal for reproduction in a line scan type display wherein the entire display area comprises a plurality of illuminable dot elements, said system comprising:

means for accepting said information signals;

means for converting that part of said information signals representative of the symbols into said second signal in which each of the symbols are represented by a plurality of information bits corresponding to unique dot elements in the line scan display;

storage means having a separate storage element for each dot element in the entire display area; means for placing each information bit in the storage element that corresponds to the dot element at which it is to be displayed in accordance with that part of said information signals representative of the symbols' location;

and means for reading from said storage means said information bits at a rate corresponding to the rate at which they are to be presented on said line scan display.

2. A data converter system in which digitally coded information signals representative of discrete symbols and their corresponding locations within a display area are converted to a second signal for reproduction in a line scan type display wherein the entire display area comprises a plurality of illuminable dot elements, said system comprising:

means for accepting said digitally coded information signals;

means for converting that part of said digitally coded information signals representative of the symbols into said second signal in which each of the symbols are represented by a plurality of information bits corresponding to unique dot elements in the line scan display;

storage means having a separate storage element corresponding to each dot element in the entire display area; means for placing each information bit in the storage element that corresponds to the dot element at which it is to be displayed in accordance with that part of said digitally coded information signals representative of the symbols' location;

and means for reading from said storage means said information bits at a rate corresponding to the rate at which they are to be presented on said line scan display.

3. A data converter system in which binary coded information signals representative of discrete symbols and their corresponding locations within a display area are converted to a second signal for reproduction in a line scan type display wherein the entire display area comprises a plurality of illuminable dot elements, said system comprising:

means for accepting said binary coded information signals;

means for converting that part of said binary coded information signals representative of the symbols into said second signal in which each of the symbols are represented by a plurality of information bits corresponding to unique dot elements in the line scan display;

storage means having a separate storage element for each dot element in the entire display area; means for placing each information bit in the storage element that corresponds to the dot element at which it is to be displayed in accordance with that part of said binary coded information signals representative of the symbols' location;

and means for reading from said storage means said information bits at a rate corresponding to the rate at which they are to be presented on said line scan display.

4. A data converter system in which information signals representative of discrete symbols and their corresponding locations within a display area are converted to a second signal for reproduction in a line scan type display wherein the entire display area comprises a plurality of illuminable dot elements, said system comprising:

means for accepting said information signals;

means for converting that part of said information signals representative of the symbols into a second signal in which each of the symbols are represented by a plurality of information bits corresponding to unique dot elements in a dot matrix, said dot matrix consisting of a plurality of dot elements on a line for each of a plurality of lines in a line scan display;

storage means having a separate storage element for each dot element in the entire display area; means for placing said information bit in the storage element that corresponds to the dot element at which it is to be displayed in accordance with that part of said information signals representative of the symbols' location;

and means for reading from said storage means and processing for display said information bits at a rate corresponding to the rate at which they are to be presented on said line scan display.

5. A data converter system in which information signals representative of discrete symbols and their corresponding locations within a display area are converted to a second signal for reproduction in a line scan type display wherein the entire display area comprises a plurality of illuminable dot elements, said system comprising:

means for accepting said information signals;

means for converting that part of said information signals representative of the symbols into a second signal in which each of the symbols are represented by a plurality of information bits corresponding to unique dot elements in a dot matrix, said dot matrix consisting of a plurality of dot elements on a line for each of a plurality of lines in a line scan display;

storage means having a separate storage element for each dot element in the entire display area; means for placing each information bit in the storage element that corresponds to the dot element at which it is to be displayed in accordance with that part of said information signals representative of the symbols' location;

means for reading from said storage means and processing for display said information bits at a rate corresponding to the rate at which they are to be presented on said line scan display;

and means for preventing the processing for display of said information bits while new information bits are being placed in said storage means.

6. A data converter system in which information signals representative of discrete symbols and their corresponding locations within a display area are converted to a second signal for reproduction in a line scan type display wherein the entire display area comprises a plurality of illuminable dot elements, said system comprising:

means for accepting said information signals;

means for converting that part of said information signals representative of the symbols into a second signal in which each of the symbols are represented by a plurality of information bits corresponding to unique dot elements in a dot matrix, said dot matrix consisting of a plurality of dot elements on a line for each of a plurality of lines in a line scan display;

storage means having a separate storage element for each dot element in the entire display area; means for sequentially placing into said storage means the groups of information bits that correspond to the lines of said dot matrix according to that part of the information signal representative of the symbols' location such that each information bit is placed in the storage element that corresponds to the dot element at which it is to be displayed;

and means for reading from said storage means and processing for display said information bits at a rate corresponding to the rate at which they are to be presented on said line scan display.

7. A data converter system in which information signals representative of discrete symbols and their corresponding locations within a display area are converted to a second signal for reproduction in a line scan type display wherein the entire display area comprises a plurality of illuminable dot elements, said system comprising:

means for accepting said information signals;

means for converting that part of said information signals representative of the symbols into a second signal in which each of the symbols are represented by a plurality of information bits corresponding to unique dot elements in a dot matrix, said dot matrix consisting of a plurality of dot elements on a line for each of a plurality of lines in a line scan display;

storage means having a separate storage element for each dot element in the entire display area; means for sequentially placing into said storage means the groups of information bits that correspond to the lines of said dot matrix according to that part of the information signal representative of the symbols' locations such that each information bit is placed in the storage element that corresponds to the dot element at which it is to be displayed;

means for reading from said storage means and processing for display said information bits at a rate corresponding to the rate at which they are to be presented on said line scan display;

and means for preventing the processing for display of said information bits while each new group of information bits that correspond to one line of said dot matrix are being placed in said storage means.

8. A data converter system in which information signals representative of discrete symbols, their corresponding locations within a display area and an indication, known as a masking bit, whether existing symbol information at this location is to continue to be displayed or removed from display are converted to a second signal for reproduction in a line scan type display wherein the entire display area comprises a plurality of illuminable dot elements, said system comprising:

means for accepting said information signals;

means for converting that part of said information signals representative of the symbols into a second signal in which each of the symbols are represented by a plurality of information bits corresponding to unique dot elements in a dot matrix, said dot matrix consisting of a plurality of dot elements on a line for each of a plurality of lines in a line scan display;

storage means having a separate storage element for each dot element in the entire display area; means for placing each information bit in the storage element that corresponds to the dot element at which it is to be displayed in accordance with that part of said information signals representative of the symbols location;

means for reading from said storage means and processing for display said information bits at a rate corresponding to the rate at which they are to be presented on said line scan display;

and means for removing from said storage means according to said masking bit the information bits that correspond to the unique dot elements that comprise a dot matrix.

9. A data converter system in which information signals representative of discrete symbols, their color and their corresponding locations within a display area are converted to a second signal for reproduction in a line scan type color display wherein the entire display area comprises a plurality of illuminable dot elements, said system comprising:

means for accepting said information signals;

means for converting that part of the information signals representative of the symbols into said second signal in which each of the symbols are represented by a plurality of information bits corresponding to unique dot elements in the line scan color display;

means for converting that part of the information signals representative of the colors of the symbols into second signals individually representative of at least one of a plurality of predetermined colors;

a plurality of storage means, each having a separate storage element corresponding to each dot element in the entire display area; means responsive to said color representative signals for placing each information bit into at least one of the plurality of said storage means in the storage element that corresponds to the dot element at which it is to be displayed in accordance with that part of said information signals representative of the symbols' location;

and means for reading from said storage device said information bits at a rate corresponding to the rate at which they are to be presented on said color display.

10. A data converter system in which digitally coded information signals representative of discrete symbols, their color and their corresponding locations within a display area are converted to a second signal for reproduction in a line scan type color display wherein the entire display area comprises a plurality of illuminable dot elements, said system comprising:

means for accepting said digitally coded information signals;

means for converting that part of the digitally coded information signals representative of the symbols into said second signal in which each of the symbols are represented by a plurality of information bits corresponding to unique dot elements in the line scan color display;

means for converting that part of the digitally coded information signals representative of the colors of the symbols into second signals individually representative of at least one of a plurality of predetermined colors;

a plurality of storage means, each having a separate storage element corresponding to each dot element in the entire display area; means responsive to said color representative signals for placing each information bit into at least one of the plurality of said storage means in the storage element that corresponds to the dot element at which it is to be displayed in accordance with that part of said digitally coded information signals representative of the symbols' location;

and means for reading from said storage device said information bits at a rate corresponding to the rate at which they are to be presented on said color display.

11. A data converter system in which binary coded information signals representative of discrete symbols, their color and their corresponding locations within a display area are converted to a second signal for reproduction in a line scan type color display wherein the entire display area comprises a plurality of illuminable dot elements, said system comprising:

means for accepting said binary coded information signals;

means for converting that part of the binary coded information signals representative of the symbols into said second signal in which each of the symbols are represented by a plurality of information bits corresponding to unique dot elements in the line scan color display;

means for converting that part of the binary coded information signals representative of the colors of the symbols into second signals individually representative of at least one of a plurality of predetermined colors;

a plurality of storage means, each having a separate storage element corresponding to each dot element in the entire display area; means responsive to said color representative signals for placing each information bit into at least one of the plurality of said storage means in the storage element that corresponds to the dot element at which it is to be displayed in accordance with that part of said binary coded information signals representative of the symbols' location;

and means for reading from said storage device said information bits at a rate corresponding to the rate at which they are to be presented on said color display.

12. A data converter system in which information signals representative of discrete symbols, their color and their corresponding locations within a display area are converted to a second signal for reproduction in a line scan type color display wherein the entire display area comprises a plurality of illuminable dot elements, said system comprising:

means for accepting said information signals;

means for converting that part of the information signals representative of the symbols into said second signal in which each of the symbols are represented by a plurality of information bits corresponding to unique dot elements in the line scan color display;

means for converting that part of the information signals representative of the colors of the symbols to second signals individually representative of at least one of three predetermined colors;

three separate storage means each corresponding to a particular color and each having a separate storage element corresponding to each dot element in the entire display area; means responsive to said color representative signals for placing each information bit in at least one of said three storage means in the storage element that corresponds to the dot element at which it is to be displayed in accordance with that part of said information signals representative of the symbols' location;

and means for reading from said storage device said information bits at a rate corresponding to the rate at which they are to be presented on said color display.

13. A data converter system in which information signals representative of discrete symbols, their color and their corresponding locations within a display area are converted to a second signal for reproduction in a line scan type color display wherein the entire display area comprises a plurality of illuminable dot elements, said system comprising:

means for accepting said information signals;

means for converting that part of the information signals representative of the symbols into said second signal in which each of the symbols are represented by a plurality of information bits corresponding to unique dot elements in the line scan color display;

means for converting that part of the information signals representative of the colors of the symbols into second signals individually representative of three colors, red, green and blue;

three separate storage means each corresponding to a particular color and each having a separate storage element corresponding to each dot element in the entire display area; means responsive to said color representative signals for placing each information bit in at least one of said three storage means in the storage element that corresponds to the dot element at which it is to be displayed in accordance with that part of said information signals representative of the symbols' location;

and means for reading from said storage device said information bits at a rate corresponding to the rate at which they are to be presented on said color display.

14. Apparatus for converting discrete bits of display information which are stored in a memory device into sequential video information for use in a line scan type display in which each bit corresponds to a unique dot element in the display, said apparatus comprising:

first and second groups of shift registers, each shift register having a plurality of storage stages;

first and second groups of normally closed gates, one of said gates being coupled to the first stage of each of said registers;

means for alternately coupling groups of said stored information bits to said first and second groups of shift registers, with the information bits that comprise a group being simultaneously coupled to different ones of the stages of said shift registers;

means for supplying separate gating pulses to each of the normally closed gates in a sequential and repetitive pattern;

means for shifting each register one position after a gating pulse has been supplied to the corresponding normally closed gate;

and means for combining the outputs of all of said gates;

the apparatus being so constructed and arranged that a group of information bits is placed in one of said groups of shift registers while gating pulses are supplied to the normally closed gates that correspond to the other group of shift registers and gating pulses are applied to one group of normally closed gates in said sequential and repetitive pattern until all the information bits have been gated out of the corresponding group of shift registers thereby providing a continuous chain of pulses in the order that corresponds to the stored information bits.

15. Apparatus as specified in claim 14 in which each group of shift registers consists of N registers and a group of information bits is placed into a group of shift registers in the following order: the first bit is placed in the first stage of the first shift register, the second bit is placed in the first stage of the second shift register, continuing in that manner until the $(N-1)$ bit is placed in the first stage of the $(N-1)$ register, the N bit is placed in the second stage of the N register, the $(N+1)$ bit is placed in the second stage of the first shift register continuing in that manner until the 2N bit is placed in the third stage of the N register and the remaining information bits that comprise a group are placed in the shift registers in the positions determined by this placement procedure.

16. Apparatus as specified in claim 15 in which each gating pulse is additionally supplied to the shift register that corresponds to the normally closed gate to which the preceding gating pulse was applied for shifting each register one position after a gating pulse has been supplied to its corresponding normally closed gate.

References Cited by the Examiner
UNITED STATES PATENTS

| | | | |
|---|---|---|---|
| 2,920,312 | 1/1960 | Gordon et al. | 340—174 |
| 3,020,525 | 2/1962 | Garrison et al. | 340—172.5 |

ROBERT C. BAILEY, *Primary Examiner.*

G. D. SHAW, *Assistant Examiner.*